United States Patent [19]

Deckers et al.

[11] Patent Number: 5,932,684
[45] Date of Patent: Aug. 3, 1999

[54] PREPARATION OF KETO-FUNCTIONAL POLYETHYLENE WAXES

[75] Inventors: Andreas Deckers, Flomborn; Eckard Schauss, Heuchelheim, both of Germany

[73] Assignee: BASF Aktiengesellschaft, Ludwigshafen, Germany

[21] Appl. No.: 08/948,070

[22] Filed: Oct. 9, 1997

[30] Foreign Application Priority Data

Oct. 24, 1996 [DE] Germany .......................... 196 442 69

[51] Int. Cl.$^6$ .................................................. C07C 45/00
[52] U.S. Cl. ........................................... 528/246; 568/395
[58] Field of Search .............................. 528/246; 568/395

[56] References Cited

U.S. PATENT DOCUMENTS 2,683,141   2/1954   Erchak ..................................... 568/395

FOREIGN PATENT DOCUMENTS 177077     12/1971   Germany .
21 02 469   8/1972   Germany .

OTHER PUBLICATIONS

Houben–Weyl, vol. 7, part 2b, p. 1287 et seq., George Thieme Verlag, Stuttgart 1976.

*Primary Examiner*—Frederick Krass
*Attorney, Agent, or Firm*—Keil & Weinkauf

[57] ABSTRACT

A process for preparing keto-functional polyethylene waxes having a molecular weight of from 150 to 1000 g/mol by telomerization of ethylene with aldehydes at from 500 to 5000 bar and from 100 to 280° C., wherein ethylene and aldehyde are employed in a molar ration of from 5:1 to 50:1.

5 Claims, No Drawings

PREPARATION OF KETO-FUNCTIONAL POLYETHYLENE WAXES

The present invention relates to a process for preparing keto-functional polyethylene waxes by telomerization of ethylene with aldehydes at from 1000 to 5000 bar and from 100 to 280° C.

The present invention also relates to the keto-functional polyethylene waxes obtainable in accordance with the novel process, to secondary amines and alcohols obtainable from the keto-functional polyethylene waxes and to the use of the keto-functional polyethylene waxes for preparing secondary amines and alcohols.

Oxidized polyethylene waxes have been known for a long time. The preparation of such waxes can be effected, for example, by copolymerization of ethylene with oxygen-containing monomers such as alkenecarboxylic acids and/or their esters (see eg. DE-A-1 770 777) or vinyl esters (DE-A-2 102 469) or by oxidation of paraffins with oxidants such as chromic acid and peroxides (Houben-weyl, vol. 7, part 2b, pp. 1287 et seq., Georg Thieme Verlag, Stuttgart 1976). These synthetic routes, however, always produce random mixtures in which the oxidized carbon atoms may be located at various positions in the polyethylene matrix. The subsequent oxidation of previously prepared polyethylene moreover also gives rise to various oxidation states such as keto, aldehyde, acid or ester groups.

To control the molecular weight of olefin polymerizations the polymerization mixture is often admixed with regulators. Examples of regulators used are hydrogen, but also aldehydes such as propionaldehyde. Thus DE-A-1 770 777 describes the copolymerization of ethylene with $C_3$–$C_{12}$-carboxylic acids and $C_4$–$C_8$-alkenes and possibly additionally esters of alkenecarboxylic acids at from 100 to 4000 bar and at from 110 to 350° C., the polymerization mixture being admixed with regulators, for example propionaldehyde in a molar proportion of from 0.5 to 6, based on 100 parts by moles of ethylene. These copolymers, which in any case comprise randomly distributed oxidized groups, do not appear to include any detectable proportion of keto groups from the propionaldehyde, according to the polymer analyses described; the sole function of propionaldehyde with these copolymerizations appears to be that of a molecular weight regulator.

It is then an object of the present invention to find a process for preparing keto-functional polyolefin waxes, which leads to polyethylene waxes in which the oxo function can be found at a defined position of the molecule and which, in terms of their chain length and degree of substitution, exhibit but low variability.

We have found that this object is achieved by a process for preparing keto-functional polyethylene waxes by telomerization of ethylene with aldehydes at from 500 and 5000 bar and from 100 to 280° C., wherein ethylene and aldehyde are employed in a molar ratio of from 5:1 to 50:1.

Furthermore, novel keto-functional polyethylene waxes obtainable according to the novel process were found, as were secondary amines and alcohols which can be prepared as secondary products from these polyolefin waxes.

The novel preparation process can be carried out under the generally known conditions of high-pressure polymerization of ethylene. The pressure at which the telomerization takes place is from 500 to 5000 bar, preferably from 1000 to 4000 bar, particularly preferably from 1500 to 3000 bar. The reaction temperature may be from 100 to 280° C., preferably from 150 to 250° C., temperatures above 250° C. generally producing waxes having a lower degree of functionalization.

The reactor used for carrying out the telomerization reaction can be any conventional pressure reactor, the reaction preferably being carried out in continuous tubular reactors or continuous stirred autoclaves.

Both the mean molecular weight of the polyolefin wax and the degree of functionalization can be influenced via the molar ratio of ethylene and aldehyde. Suitable keto-functional polyolefin waxes are obtained at molar ratios of ethylene to aldehyde of from 5:1 to 50:1. Preferably this molar ratio is from 5:1 to 20:1, particularly preferably from 5:1 to 15:1.

The properties of the polyethylene waxes according to the invention can also be modified by the choice of aldehyde. Particularly suitable aldehydes for use in the novel telomerization process are compounds of the formula I

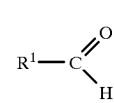

I where $R^1$ is $C_1$–$C_{20}$-alkyl or $C_2$–$C_{20}$-alkenyl, in which nonadjacent and nonterminal $CH_2$ groups may also be replaced by —O—CO—, —CO—O— or —CO— and which may be substituted by phenyl or —CHO, or is $C_6$–$C_{20}$-aryl.

Examples to be mentioned of $C_1$–$C_{20}$-alkyl are methyl, ethyl, n-propyl, isopropyl, n-butyl, isobutyl, sec-butyl, tert-butyl and the various branched or unbranched isomers of pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl. Possible $C_2$–$C_{20}$-alkenyls include the corresponding singly or multiply unsaturated radicals, the ethenyl group being less suitable in many cases because of the tendency of acroleine to be randomly integrated into the polyethylene chain. Preferred alkenyls are those having a terminal double bond, since the polyethylene waxes resulting from such aldehydes can be readily derivatized further at the end of the molecule, for example by epoxidation followed by nucleophilic attack or by addition reactions to the double bond.

The alkyls or alkenyls $R^1$ may also be substituted by further aldehyde functions. Thus it is also possible, for example, for dialdehydes such as succinaldehyde or glutaraldehyde to be used as aldehydes of formula I in the preparation process according to the invention.

To be mentioned in particular among the $C_6$–$C_{20}$-aryls $R^1$ are phenyl and naphthyl, which aromatic radicals may be substituted by ester or alkyl groups.

Preferred radicals $R^1$ are $C_1$–$C_5$-alkyls, the aldehyde used therefore being acetaldehyde, propionaldehyde, butyraldehyde, pentanal or hexanal.

The keto-functional polyethylene waxes obtainable in accordance with the novel preparation process have some remarkable properties. They exhibit a high degree of functionalization, so that generally more than 60%, preferably more than 70% of the molecules carry a keto group. On the other hand, they are distinguished by a very narrow molecular weight distribution, expressed as the quotient $Q=M_w/M_n$. This quotient generally ranges from 1.4 to 2.0, with molecular weights of from about 150 to 1000 g/mol.

This low variability, both in terms of chain length and of the low proportion of nonfunctionalized molecules means that the novel keto-functional polyethylene waxes are of interest not only for the known applications of oxidized polyethylene waxes such as floor polishes or coating compounds, but also as an intermediate for further reactions to produce interesting classes of products which are in some cases not otherwise readily accessible.

Thus it is possible to subject the keto-functional waxes to reductive amination, thereby producing secondary amines which are used, for example, as fuel additives. Said reductive amination can be carried out by any of the methods known to those skilled in the art.

The keto-functional waxes may also be subjected to reduction, thereby producing secondary alcohols which in turn can be converted into various esters. The reduction likewise can be carried out by any method known to those skilled in the art.

The invention is illustrated by the following examples:

EXAMPLES 1 TO 4

Gaseous ethylene (10 kg/h) was compressed to 220 bar in three stages by a diaphragm compressor. With the aid of a piston pump the respective aldehyde was pumped into the supercritical ethylene, and the mixture was then compressed further to 1500 bar and pumped continuously into a stirred flow autoclave which had been set to 220° C. The autoclave had a volume of 1 l and a length/diameter ratio of 5:1. The oligomerization was started by a solution of 0.2 wt % of tert-butyl peroxypivalate and 0.5 wt % of tert-butyl peroxy-3,5,5-trimethylhexanoate in isodecane (wt % each based on the total weight of the solution) being pumped in continuously (metering rate 105 ml/min). The mean residence time of the reaction mixture in the autoclave was about 90 seconds.

The results are shown in the following table:

| Example | Aldehyde | Molar ratio ethylene/aldehyde | $M_n$ (g/mol) | Q $M_w/M_n$ | Degree of functionalization* |
|---|---|---|---|---|---|
| 1 | Propionaldehyde | 10:1 | 460 | 2.0 | 71% |
| 2 | Propionaldehyde | 8:1 | 250 | 1.9 | 75% |
| 3 | Propionaldehyde | 5:1 | 220 | 1.9 | 78% |
| 4 | Undec-ω-enal | 20:1 | 430 | 1.9 | 62% |

*Degree of functionalization determined by IR analysis of the CO bands

We claim:

1. A process for preparing keto-functional polyethylene waxes having molecular weights of from about 150 to 1000 g/mol which comprises telemerizing ethylene with aldehydes at from 500 to 5000 bar and from 100 to 280° C., said ethylene and aldehyde being employed in molar ratio of from 5:1 to 50:1 wherein more than 60 percent of the molecules produced by said process carry a keto group.

2. The process for preparing keto-functional polyethylene waxes claim 1, wherein ethylene and aldehyde are employed in a molar ratio of from 5:1 to 20:1.

3. The process for preparing keto-functional polyethylene waxes claim 1, wherein ethylene and aldehyde are employed in a molar ratio of from 5:1 to 15:1.

4. The process for preparing keto-functional polyethylene waxes claim 1, wherein the aldehyde employed is a compound of the formula I

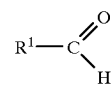

where $R^1$ is $C_1$–$C_{20}$-alkyl or $C_2$–$C_{20}$-alkenyl, in which nonadjacent and nonterminal $CH_2$ groups are optionally replaced by —O—CO—, —CO—O—or —CO— and which are optionally substituted by phenyl or —CHO, or is $C_6$–$C_{20}$-aryl.

5. The process for preparing keto-functional polyethylene waxes claim 4, wherein $R^1$ is $C_1$–$C_5$-alkyl.

* * * * *

UNITED STATES PATENT AND TRADEMARK OFFICE
CERTIFICATE OF CORRECTION

PATENT NO.: 5,932,684

DATED: August 3, 1999

INVENTOR(S): DECKERS et al.

It is certified that error appears in the above-identified patent and that said Letters Patent is hereby corrected as shown below:

Col. 4, claims 2, 3, 4 and 5, second line of each claim, after "waxes" insert --of--.

Signed and Sealed this

Fourteenth Day of December, 1999

Attest:

Attesting Officer

Q. TODD DICKINSON

Acting Commissioner of Patents and Trademarks